United States Patent
Buchwald et al.

(10) Patent No.: US 8,096,563 B2
(45) Date of Patent: Jan. 17, 2012

(54) RECREATION DEVICE FOR SLIDING DOWNHILL ON A SURFACE

(75) Inventors: Charles Buchwald, Salt Spring Island (CA); Donald Arney, Salt Spring Island (CA); Peter Brooke, Ladysmith (CA)

(73) Assignee: Donald Arney, Salt Spring Island (CA)

( * ) Notice: Subject to any disclaimer, the term of this patent is extended or adjusted under 35 U.S.C. 154(b) by 528 days.

(21) Appl. No.: 11/815,388

(22) PCT Filed: Feb. 7, 2006

(86) PCT No.: PCT/CA2006/000163
§ 371 (c)(1),
(2), (4) Date: Aug. 2, 2007

(87) PCT Pub. No.: WO2006/081686
PCT Pub. Date: Aug. 10, 2006

(65) Prior Publication Data
US 2010/0133767 A1    Jun. 3, 2010

(30) Foreign Application Priority Data
Feb. 7, 2005  (CA) .................................. 2496338

(51) Int. Cl.
*B62B 15/00* (2006.01)
*B63B 35/81* (2006.01)
(52) U.S. Cl. .................. 280/28.15; 280/21.1; 441/68
(58) Field of Classification Search ............ 280/845, 280/15, 16, 21.1, 28, 28.14, 28.15, 600, 601, 280/288.4, 290; 441/68, 74; *A63C 5/00; B62B 17/00*
See application file for complete search history.

(56) References Cited

U.S. PATENT DOCUMENTS

| | | | | |
|---|---|---|---|---|
| 2,480,406 A * | 8/1949 | Forney | ............ | 182/3 |
| 3,689,092 A * | 9/1972 | Lake | ............ | 280/606 |
| 4,676,521 A * | 6/1987 | Monreal | ............ | 280/606 |
| 4,865,572 A * | 9/1989 | Andes | ............ | 441/72 |
| 5,380,034 A | 1/1995 | Wilson | | |
| 5,509,665 A * | 4/1996 | Hansen | ............ | 280/22.1 |
| 6,179,305 B1 * | 1/2001 | Capozzi et al. | ............ | 280/28.14 |
| 6,601,858 B1 * | 8/2003 | Farley | ............ | 280/25 |
| 6,905,128 B1 * | 6/2005 | Lear et al. | ............ | 280/16 |
| 7,090,227 B2 * | 8/2006 | Morin | ............ | 280/14.1 |

FOREIGN PATENT DOCUMENTS

DE    29704951    6/1997
WO    9319968     10/1993

* cited by examiner

*Primary Examiner* — Jeffrey J Restifo
*Assistant Examiner* — James M Dolak

(57) ABSTRACT

A recreation device, used for sliding downhill on a surface, on which the rider is suspended above the surface, either in a generally horizontal position—face up or face down—or in a reclined position, thereby providing the rider with a unique experience or sensation. The winter recreation device comprises a slide member having a top and a low friction bottom adapted for sliding on the surface, a support connected to the top of the slide member and extending upward away from the slide member, and a harness suspended from the support, wherein the support and harness are adapted to suspend a user of the apparatus above the surface.

20 Claims, 10 Drawing Sheets

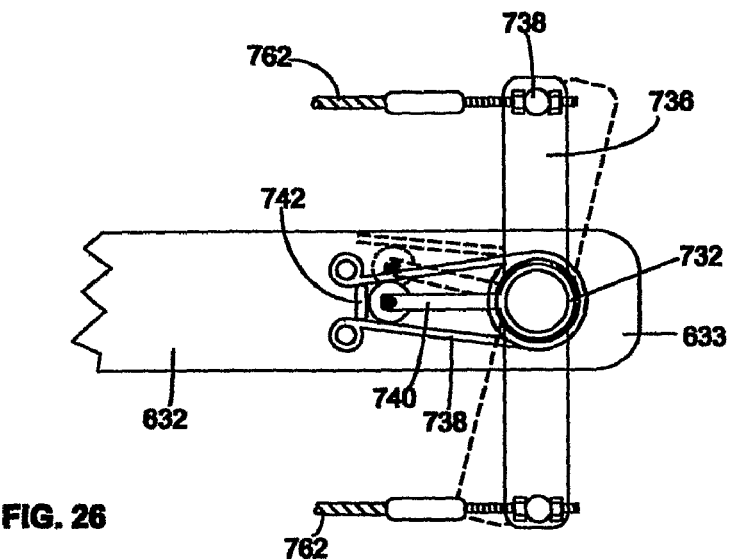
FIG. 26
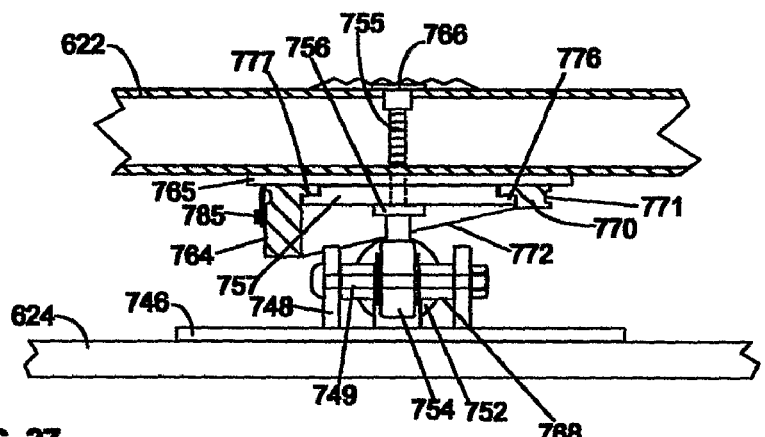
FIG. 27
FIG. 28

RECREATION DEVICE FOR SLIDING DOWNHILL ON A SURFACE

BACKGROUND OF THE INVENTION

1. Field of the Invention

The present invention relates to the field of devices on which a user can slide downhill on snowy surfaces and the like. More particularly, the invention relates to devices on which a user reclines while riding downhill, such as sleds, luges and toboggans.

2. Description of the Prior Art

In the prior art, there have been numerous devices that a user can ride downhill on snowy or icy surfaces. The most popular of these include skis, snowboards, sleds, toboggans and luges. With skis and snowboards, the user rides downhill while standing; whereas, with sleds, luges and toboggans, the user is either seated or reclined directly on the device. Heretofore, there has not been a device that provides the user with the unique experience of feeling like he or she is 'flying' over the snow.

SUMMARY OF THE INVENTION

Accordingly, the present invention provides a novel recreation device on which the rider is suspended above the snowy or like surface, either in a generally horizontal position—face up or face down—or in a reclined position, thereby providing the rider with a unique experience or sensation.

According to one aspect of the present invention there is provided a recreation apparatus for sliding downhill on a snow covered surface and the like, comprising a slide member having a top and a low friction bottom adapted for sliding on the surface, a support connected to the top of the slide member and extending upward away therefrom, and a harness suspended from the support, wherein the support and harness are adapted to suspend a user of the apparatus above the surface. The support and the harness may be adapted to suspend the user in a horizontal position, either face up or face down.

In some embodiments, the slide member may be a conventional ski or snowboard having mount points on the top, and the support may be adapted for connecting to the mount points. A steering mechanism may be included connected to the support or the slide member, and adapted for being actuated by the user to steer the apparatus while it is in motion. Some embodiments may include a handhold connected to the support or the slide member, and adapted for being grasped by the user. In some embodiments, the support comprises a keel portion that is connected to the slide member, a mast portion connected to the keel portion and extending upwards from the slide member, and a boom portion connected to the mast portion for suspending the harness over the slide member. Alternatively, the support may comprise a keel connected to the top of the slide member, a mast connected to the keel and extending upwards from the slide member, and a cantilevered boom connected to the mast and extending over the slide member for suspending the harness over the slide member. The mast may be connected for hinged movement in relation to the keel such that the mast may be swung from an upright position to a folded position in which it is generally parallel with the keel. The boom may be connected for hinged movement in relation to the mast such that the boom may be swung from an operable position in which the boom is generally perpendicular to the mast, to a folded position in which the boom is generally parallel with the mast.

In some embodiments, the steering mechanism comprises two parallel arms, each hingedly connected to the support on either side of the median plane of the apparatus, and each having a remote end that extends rearward beyond the periphery of the slide member, each arm being independently moveable by the user between a first position in which the remote end scrapes the surface and a second position in which the remote end is removed from the surface. The steering mechanism may further include a planar rudder connected to each remote end for contacting and scraping the surface when the arm is in the first position, as well as a foot harness connected to each remote end for receiving a user's foot thereby enabling the user to move each arm with his feet. An adjustable strap may be provided that is connected between the boom and each rudder arm for supporting the weight of the user's legs.

In some embodiments, the recreation device may include at least one tilt generator that connects the support to the slide member, and having an actuator means that receives input from a user and causes the tilt generator to impart a motive force to the slide member to tilt the slide member about a longitudinal axis relative to the support. The tilt generator may comprise of a hinge connector for connecting the slide member to the support such that the slide member is able to tilt about a longitudinal axis relative to the support, a cam movably mounted on each side of the support and being connected to the actuator means in a manner that the actuator means simultaneously causes the cam on one side to move in one direction and the cam on the opposite side to move in an opposite direction, and a corresponding number of cam followers mounted on the slide member such that the cam followers cooperate with the cams to impart the motive force to the slide member to tilt the slide member relative to the support. The tilt generator may also include a disk member rotatably mounted on the support on which the cams are mounted at diametrically opposed portions, one cam on each side of the support, and the movement of the cams results from the rotation of the disk member. In some embodiments, the disk member may include a circumferential groove on its edge, and the actuator may be a cable wound around the disk member within the groove, and a lever that is moveable by the user and to which the cable ends are connected whereby movement of the lever translates to rotation of the disk member and hence movement of the cams.

The present invention further provides an apparatus for attaching to a conventional snowboard to provide a recreation device for sliding downhill on a snow covered surface and the like, comprising a support adapted to being connected to the snowboard and extending upward away therefrom, and a harness suspended from the support, wherein the support and harness are adapted to suspend a user of the device above the surface.

BRIEF DESCRIPTION OF THE DRAWINGS

For a better understanding of the present invention and to show more clearly how it may be carried into effect, reference will now be made by way of example to the accompanying drawings:

FIG. 26 A bottom view of the handlebar assembly of the device in FIG. 23;

FIG. 27 A longitudinal section of a tilting mount assembly of the device in FIG. 23;

FIG. 28 A cross section view of a titling mount assembly of the device in FIG. 23;

DETAILED DESCRIPTION

Figure 1:
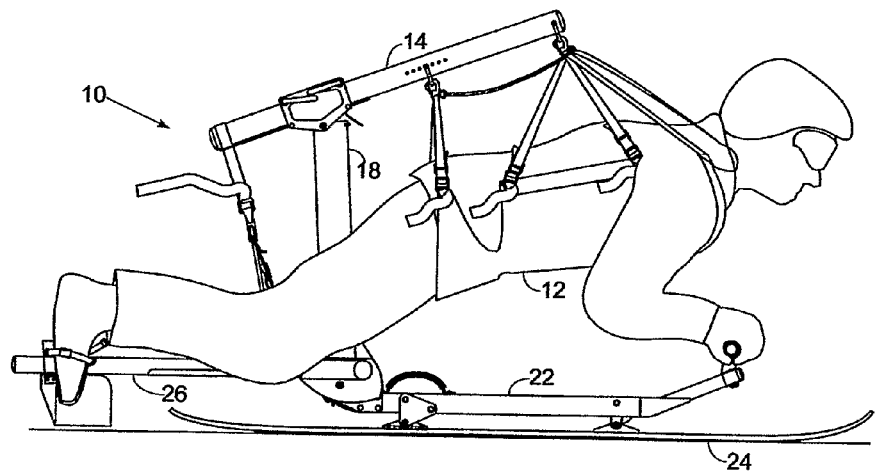
FIG. 1A side view of an embodiment of a recreation device of the present invention in which the rider is suspended in a generally horizontal, face down (i.e. prone) body position.

In the accompanying drawings, like numerals indicate the same elements. It will be understood that the present disclosure is an exemplification of the principles of the invention and does not limit the invention to the illustrated embodiments. Therefore, specific details disclosed herein are not to be interpreted as limiting, but rather as a basis for the claims and as a representative basis for teaching one skilled in the art to employ the present invention. Directional references such a up, down, fore, aft, left, right, rearward and the like refer to the device in the orientation in which it would be normally used for sliding downhill and from the point of view of the user.

Referring to FIGS. 1-17, an embodiment of the recreation device is generally indicated at 10. Device 10 includes a harness 12 suspended from a support comprising an elongate tubular boom 14, a tubular mast 18 and a tubular keel 22. The boom 14 is connected to the top portion 16 of mast 18. The bottom portion 20 of the mast is connected to a keel 22, which is connected to a slide member having a low friction bottom adapted for sliding on snow covered surfaces, such as a conventional snowboard 24, but could also be a ski, mono-ski and the like. It will be apparent to persons skilled in the art that such winter devices may be used for sliding down other surfaces that mimic the sensation of a snow covered surface; for example conventional snowboards and skis have been used for sliding down sand dunes or on inclined ramps having low friction surface. Accordingly, while the invention herein is described in the context of its conventional use on snow covered surfaces, the other uses of the invention should also be borne in mind on alternative surfaces. Device 10 also includes a steering/braking assembly 26. Boom 14 is hinged to mast 18, and mast 18 and steering/braking assembly 26 are each independently hinged to keel 22, thereby enabling device 10 to be collapsed into a folded configuration as shown in FIG. 3.

Referring to FIGS. 2-7, keel 22 comprises an elongate tubular member, generally rectangular in cross-section, and having front and rear end portions 28 and 30. A riser tube 32 is connected at the front end portion 28 and extends forward and upward away from the keel. At terminal end 33 of riser tube 32 is provided a handhold, such as handle bar 34 for bracing the front of the rider's body in absorbing shocks and in shifting the rider's weight fore, aft or sideways to control the board in conjunction with the rudders or the brakes. The handlebar may be adjustable for height as well as fore and aft, and it may be attached to a sprung stem (similar to those used on mountain bicycles) for absorbing shocks. The handlebars may also be foldable to reduce overall width for transport or storage. Other configurations of a handlebar are possible, and it may be attached to the slide member instead of the keel.

The keel 22 includes front and rear mounting assemblies 36 and 38 for mounting the keel to the snowboard 24. The spacing between the mounting assemblies 36 and 38 corresponds to the spacing between the mount points on the snowboard. Each of the mounting assemblies comprises a mount bracket 40 for bolting to the corresponding mount point of the snowboard. Mount brackets 40 include a rectangular plate portion 42 having a planar contact surface 44 and a raised side flange portion 46 on each side with a transverse threaded hole 47. The plate portion 42 includes a plurality of slotted holes 48 to accommodate the diversity in the spacing and pattern of the threaded holes 25 found in the mount points of conventional snowboards.

Figure 35:
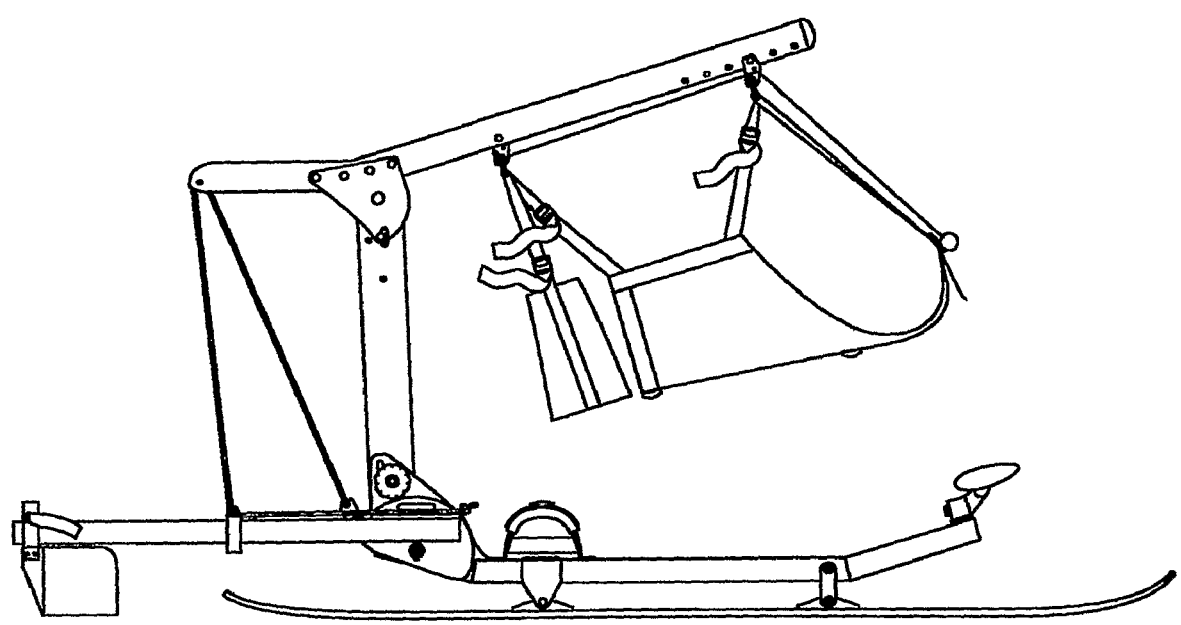
FIG. 35 A side view of a further embodiment of a recreation device of the present invention.

Referring to FIGS. 4-7, in the front mounting assembly 36, the mount bracket is connected to a resiliently flexible polymer link member 50 via bolts 52 that pass through the threaded holes 47 on the flange portions and through transverse bore 54 in the bottom portion of the link member. The bottom of the keel is provided with an opening 56 through which the top portion of the link member is inserted into the keel. Holes 58 are provided through the sides of the keel that aligns with bore 60 through the top portion of the link member. Bolts 62 fasten the link member to the keel. Accordingly, the link member at the front is recessed into the keel to allow more height for this flexible link, while maintaining the keel as low as possible relative to the snowboard thereby minimizing the folded height of the device. If more direct control is required, the polymer link in the front mounting assembly 36 may be replaced with a more rigid link member as shown in FIG. 35.

Figure 8:
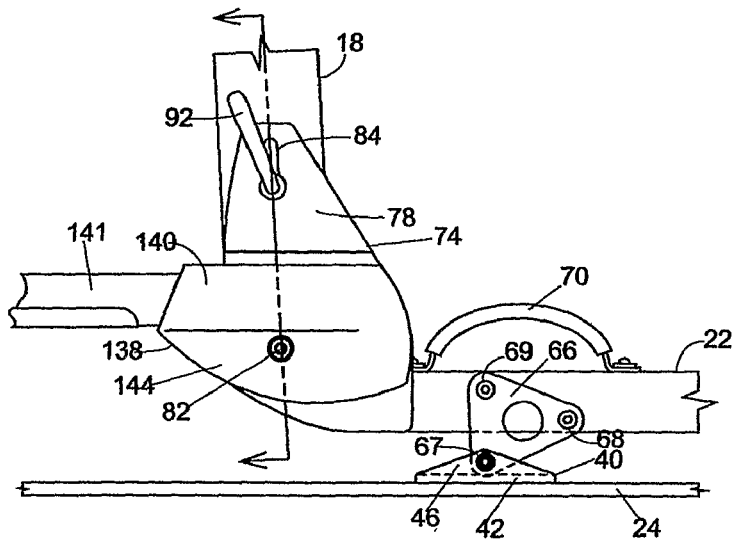
FIG. 8 A side view of a rear portion of the device in FIG. 1 showing the rear mounting assembly and mast socket assembly.
Figure 9:
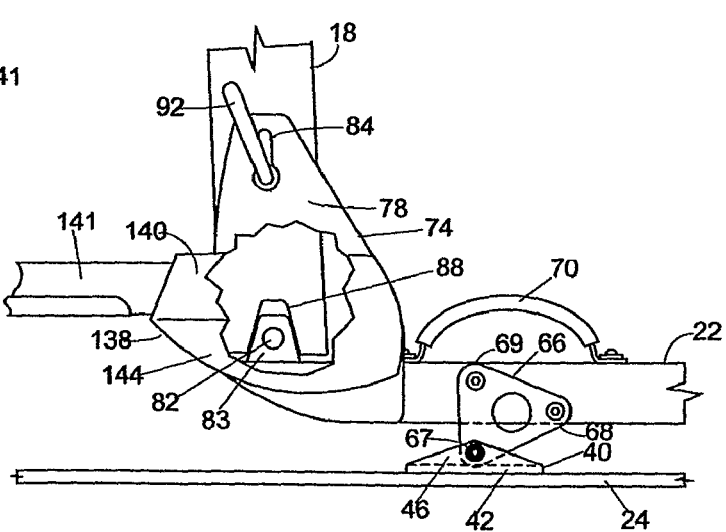
FIG. 9 A side view of the rear portion in FIG. 8 with a part of the side plate cut away.

Referring to FIGS. 8 and 9, in the rear mounting assembly 38, the mount bracket is connected to the keel 22 by two triangular plates 66 (one on each side), each of which includes holes 67, 68 and 69 at the apexes. The plates 66 are bolted to the mount bracket by means of the holes 67 in the flanges 47, and to the sides of the keel by means of holes (not shown) that align with holes 68 and 69 in the triangular plates. Accordingly, the rear mounting assembly allows the board to rotate longitudinally around the rear of the keel to accommodate bending of the board during use, but transmits all sideways "lean" forces from the mast to the board. Alternatively, if a softer suspension (and link between the keel and the board) is desired, the rigid links in the rear mounting assembly may be substituted with a polymer mount as in the front mounting assembly. A foot strap 70 is included on the top of keel 22 adjacent the rear mounting assembly for use by the rider in 'scootering' the device to and from a chairlift or on generally horizontal surfaces.

Figure 10:
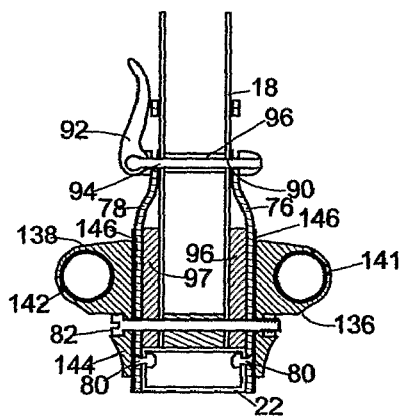
FIG. 10 A cross section B-B of the portion of the device in FIG. 8.

Referring to FIGS. 8-10, to the rear end 30 of the keel 22 is bolted a mast socket assembly 74 for hingedly connecting the mast 18 and the steering/braking assembly 26 to the keel. The mast socket assembly 74 comprises two side plates 76 and 78 (each a mirror image of the other) that are each fastened near their bottom portion to a side of the keel 22 by fasteners 80. The side plates 76 and 78 extend upwards and taper inward to accommodate for the mast that is narrower than the keel. A bolt 82 extends between the plates and through the mast at a location above the keel. The bolt 82 includes a hard plastic spacer 83 that fits between the side plates 76 and 78, and rests on the keel. The cross section of the spacer is trapezoidal in shape. The bottom edge 86 of the mast includes a complimentary tapered slot 88 on each side that corresponds to the spacer 83 so that the bottom of the mast fits snugly over the spacer when the mast is fully inserted in the mast socket assembly. The spacer provides a fixed width for the pivot bolt to be tightened against to prevent distortion of side plates 76 and 78, and it provides a wider load bearing surface for the slots 88 in the mast to contact (as opposed to just bearing on bolt 82) to prevent distortion in the walls of the slots since this area is highly loaded due to the moment placed on the mast by the rider's weight.

In the tapered portion of each side plate 76 and 78, and in vertical alignment with the bolt 82 is provided a vertical slot 84. The lower portion of the mast further includes a hole 90 through the mast that aligns with the slots 84 on the side plates 76 and 78. The mast is connected to the side plates by a quick release clamp 92, which has a shaft 94 that passes through the slots 84 and hole 90 while the mast is received within the mast socket assembly. A rigid tubular spacer 96 having a length equal to the inside dimension of the mast is fitted on the shaft 94 within the mast, and allows the clamp 92 to be tightened without crushing the mast. Rigid plastic spacers 96 and 97 are provided to fill the gap due to the difference in width of the keel and the narrower mast and to provide extra support.

With the clamp 92 being released, the mast can be raised or lowered within the confines provided by the shaft 94 of the clamp traveling within slots 84. The bolt 82, the slots 84 and the hole 90 are relatively positioned so as to enable the bottom edge 86 of the mast to clear the spacer 83 when the mast is at its upper end of travel, and to enable the slots 88 to fully engage the spacer 83 when the mast is at its lower end of travel. With the clamp 92 tightened, the top portions of the side plates 76 and 78 grip the mast to prevent movement of the mast in relation to the plates. Accordingly, the mast may be locked into an upright alignment by fitting the slots 88 over the spacer 83 and tightening the clamp 92, and it may be folded parallel to the keel by releasing the clamp, sliding the mast upward such that the slots 88 clear the spacer 83. The mast is held snugly in the socket when the quick release clamp 92 is tightened, and any weight shifting inputs from the rider are transmitted directly to the keel and to the snowboard to allow precise control of the device.

Figure 11:
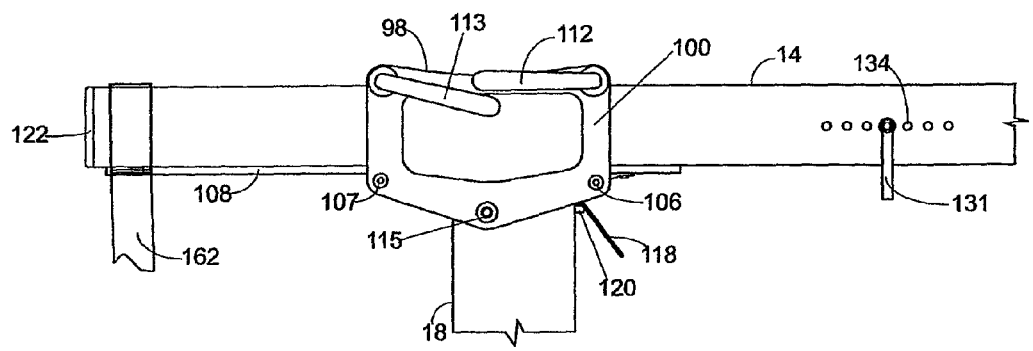
FIG. 11 A side view of a portion of the device in FIG. 1 showing the rear part of the boom, the top of the mast and the connector bracket.
Figure 12:
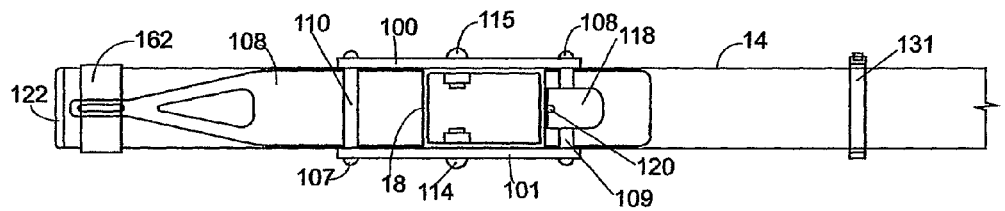
FIG. 12 A bottom view of the portion of the device in FIG. 11.
Figure 17:
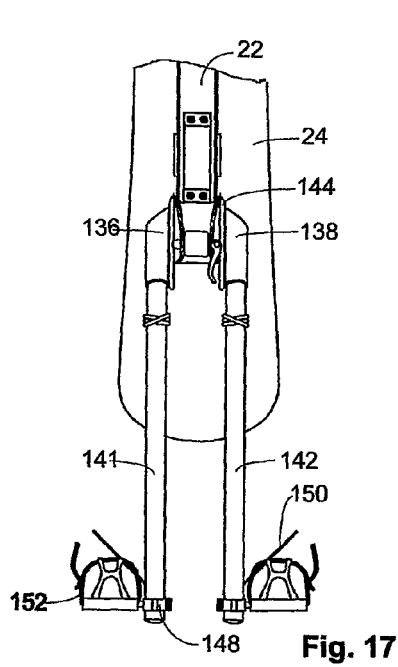
FIG. 17 A top view of a rear portion of the device in FIG. 1, excluding the mast and boom, showing the steering/braking assembly.
Figure 15:
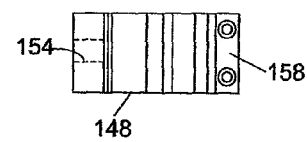
FIG. 15 A top view of the rudder fitting in FIG. 13.
Figure 14:
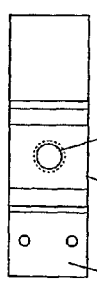
FIG. 14 A side view of the rudder fitting in FIG. 13.
Figure 13:
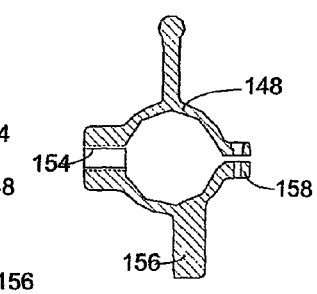
FIG. 13 A mid-line section of a rudder fitting.
Figure 16:
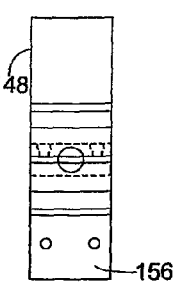
FIG. 16 A side view of the rudder fitting from the side opposite of that in FIG. 14.

Referring to FIGS. 11 and 12, boom 14 is connected to mast 18 for hinged movement in relation thereto by connector bracket 98 such that the boom may be swung from a position in which it is cantilevered by the mast—being generally perpendicular to the mast, to a folded position in which the boom is generally parallel with the mast. Connector bracket 98 comprises side plates 100 and 101 (one on each side), each of which is generally pentagonal in shape and includes a hole near each of its apexes. Plates 100 and 101 are connected to each other at the lower fore and aft apexes by bolts 106 and 107, and internal tubular spacers 109 and 110, and by quick release clamps 112 and 113 at the upper apexes, thereby providing a bracket for slidably receiving boom 14 in a manner that the boom is supported by bolts 106 and 107. A rigid reinforcement plate 108 is provided on the lower side of the boom to prevent excess loading on the boom that could otherwise lead to buckling at the points where the boom rests on internal spacers 109 and 110 on the bolts 106 and 107. The boom 14 may be clamped tightly within the connector bracket 98 by tightening the quick release clamps 112 and 113, which force the plates 100 and 101 to grip the boom. The quick release clamps are analogous to the kinds of quick release clamps typically used on bicycles. The quick release clamps allow the boom to be disassembled easily from the mast, or to be adjusted fore and aft as required to accommodate riders of different sizes or preferences for fore and aft weight distribution of the rider's weight relative to the snowboard.

The connector bracket 98 is hingedly attached to top end of mast 18 by pivot bolts 114 and 115, each of which passes through a corresponding hole that is provided through the top portion 16 of the mast at a position that is offset towards the rear of the center of the mast. The rearward offset enables the boom to be folded parallel to the mast when collapsing the device 10.

A spring clip boom lock 118 is provided on the bottom of the boom that releasably engages a pin 120 on the front of the mast when the boom reaches a position in which it is approximately perpendicular to the mast. When engaged, the boom lock maintains the boom at about a 90 degree angle to the mast and prevents it from rotating. In this orientation the boom may be used to control the device when scootering towards a chair lift and when dismounting the chair lift. Having the boom thus locked also allows the rider to distribute the weight of the device over the top of his legs when on a chairlift, with the boom sitting upon the legs. The boom lock has a large release lever portion allowing use while wearing gloves. Prior to use of the device for sliding downhill, the boom lock is disengaged from the pin to allow rotation of the boom relative to the mast. An alternative lock arrangement may include a release mechanism and cable inside the mast that is triggered when the steering/braking mechanism is folded backwards for use, such that the cable retracts a pin and releases the boom catch automatically.

The tubular boom 14 includes removable but securely inserted end caps 122 that allow the inside of the tube to be used for storage.

Figure 2:
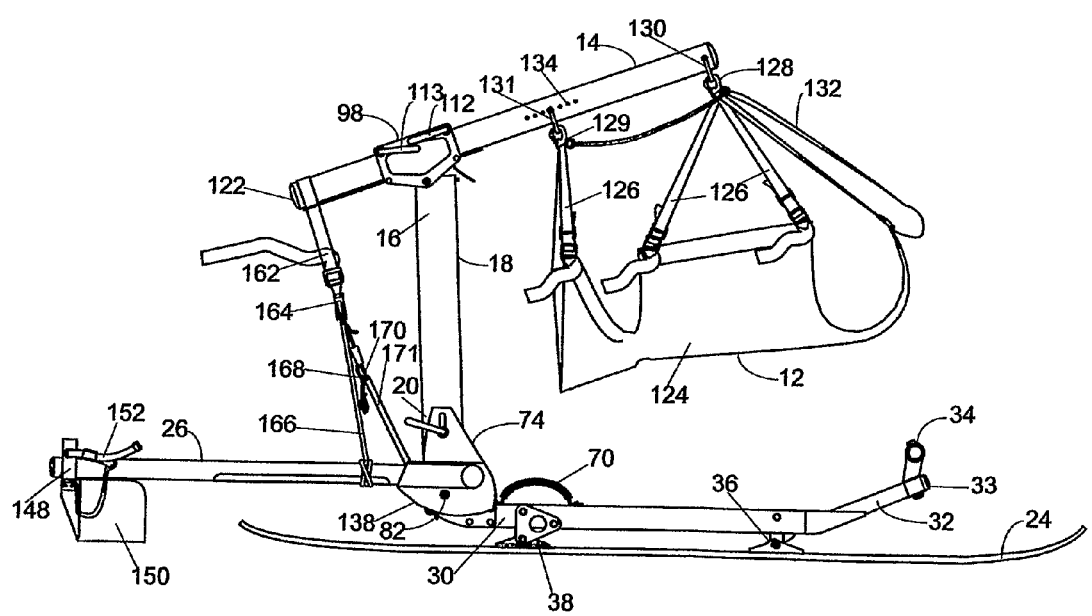
FIG. 2 A side view of the device of FIG. 1.
Figure 3:
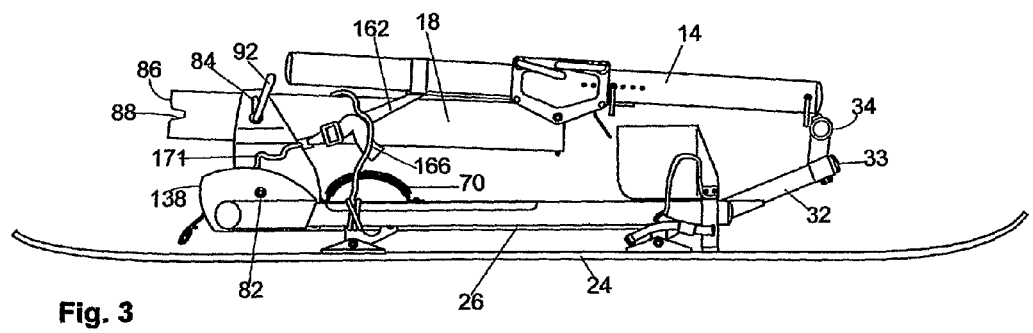
FIG. 3 A side view of the device of FIG. 1 in a collapsed configuration.
Figure 4:
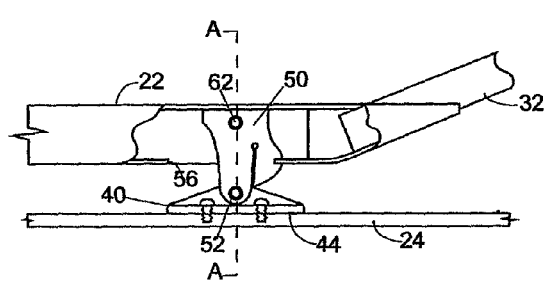
FIG. 4 A side view of a front portion of the device in FIG. 1 with a portion of the keel cut away, exposing the front mounting assembly.
Figure 5:
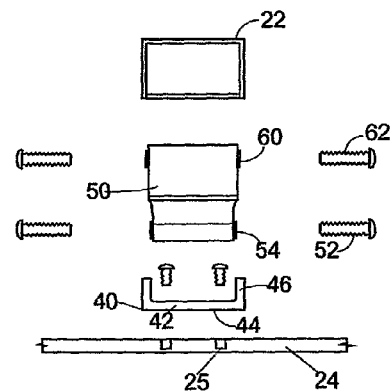
FIG. 5 A front exploded view of the front mounting assembly.
Figure 6:
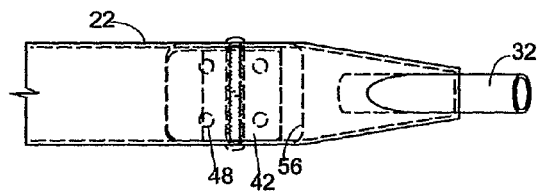
FIG. 6 A top plan view of the portion of the device in FIG. 4 with the interior and underlying structure being shown with dashed lines.
Figure 7:
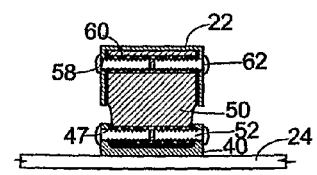
FIG. 7 A cross section A-A of the front portion of the device in FIG. 4.

Referring to FIGS. 1 and 2, harness 12 comprises a form fitting fabric member 124 that is adapted to support the torso of a user in a generally horizontal position. Fabric member 124 is attached by adjustable straps 126 to quick release hooks 128 and 129 that connect to suspension shackles 130 and 131 on the boom for suspending the harness below the boom. The harness can be a strap-on type (as shown) or it can be integral with a jacket (not shown). In either case, a pull cord 132 attached to the quick release hooks 128 and 129 and positioned near one shoulder of the rider allows the rider to release the quick release hooks by pulling on the cord. This makes dismounting easier and allows easy disengagement from the device if the rider falls over. The rear shackle 131 is attached to the boom through one of a number of longitudinally arranged holes 134, thereby enabling a fore-aft adjustment of the shackle 131 to accommodate riders of different torso length or preferences. Additional fore and aft adjustment of the harness as a unit is accomplished by sliding the boom in the connector bracket 98 by using the quick release clamps 112 and 113. In some embodiments, the harness can incorporate attachments that allow it to be used as a back pack, with the device attached to it, for hiking into the backcountry. As well, the harness may include built in storage compartments or pockets.

Steering/braking assembly 26 comprises left and right rudder arm pivot members 136 and 138 that are attached to the mast socket assembly by means of the bolt 82 such that each is able to rotate independently in relation to the mast socket assembly. The rudder arm pivot members each include a tubular portion 140 in which is securely connected left or right tubular rudder arm 141 and 142, and a planar portion 144 which is adapted to rest flush against the respective side plate 76 or 78 of the mast socket assembly. In between each planar portion and side plate of the mast socket assembly is a thin plastic bearing sheet 146 to reduce friction. The pivot members are designed for minimum sideways deflection when the lateral steering loads are applied to them. As well, the location of the pivot point (the point of attachment to the mast socket assembly by bolt 82) of each pivot member is offset rearwards to provide more forward support to resist the lateral twisting force applied to the pivot as a result of steering inputs.

At the remote end of each rudder arm 141 and 142 is a rudder fitting 148 by which a rudder 150 and foot harness 152 is attached to the rudder arm. The foot harness can be as simple as a pad and strap that fits the rider's toe, or it can be a swiveling pedal with step-in or strapped-in bindings, or a "clipless" pedal as used on bicycles. Both rudder arms have the same fitting installed, with the larger hole 154 for receiving the foot harness 152 facing outwards. Each rudder 150 is bolted to downward facing tab 156 of its respective rudder fitting. Each rudder fitting is secured to its rudder arm by bolts through clamp tab 158, and both rudder fittings are adjustable fore and aft along the rudder arms to accommodate varying rider leg lengths. Each rudder is set at an acute angle—preferably a 45 degree angle—outward to the longitudinal axis of the rudder arm on which it is mounted. This configuration enables the rudders to be used for both steering (when applied individually) and braking (when applied in unison). In addition, each rudder is shaped and angled to provide an upward force on its rudder arm when in use, thereby preventing them from self-applying and digging deeper into the snow than intended by the rider, and such that a small area at the leading edge contacts the snow first allowing the rudder to more effectively dig into hard packed snow or ice.

An adjustable rudder suspension strap 162 is connected to the rear portion of boom 14 and includes a block 164 through which a line 166 is run and connected to each rudder arm. The rudder suspension strap 162 maintains each rudder arm above the snow when the rider's body is suspended in the harness 12, and the block 164 and line 166 provide a pulley mechanism to transmit a downward movement of one rudder arm into an upward movement of the other rudder arm. A boom travel limiting strap 168 comprising of an internal elastic bungee cord 170 within a fixed length webbing element 171 is connected to the back of the keel and to the rudder suspension strap 162. The bungee cord pulls the rear of the boom down when the rider removes his weight from the harness, thereby applying a braking force to the device by allowing both rudder arms to fall causing the rudders to dig into the snow. The fixed length-webbing element of the travel limiting strap 168 prevents the strap from lengthening beyond a particular limit, thus it counterbalances the rider's weight in the harness.

Referring to FIG. 3, in order to fold the device into its collapsed configuration (as illustrated), the boom 14 is pivoted backward on pivot bolts 114 and 115 so that the boom is substantially parallel to the mast 18. Clamp 92 is loosened and the mast (together with the boom) is pivoted forward so that it is substantially parallel with the keel 22, and the front of the boom rests on the handlebars 34. The rudder arms 141 and 142 are also folded forward and lie on either side of the keel 22. To deploy the device from collapsed configuration, the rudder arms are folded over backwards so that the rudders contact the snow. If needed, the rudders can be pressed down into the snow using foot pressure to act as "parking brakes". The rider then lifts the boom from the front. As it is lifted up and rearwards it starts to lift the mast. As the mast lifts, the boom can be pivoted simultaneously forward. When the boom becomes perpendicular to the mast, the boom lock 118 engages pin 120 and stops further rotation of the boom relative to the mast. The bottom of the mast is seated into the mast socket 74 such that slots 88 are firmly seated over spacer 83, and the quick release clamp 92 is tightened. The limit strap 168 is connected onto the rear of the keel. Alternatively this strap can be left attached and loosened for folding then re-tightened to use the device (the straps between the rudder arms and the back of the boom remain in place and have enough slack to allow folding the rudder arms over). The bungee in the strap pulls the rear of the boom downwards.

Further adjustment of the device is accomplished by adjusting the straps 126 of the harness; by adjusting the fore and aft position of the boom relative to the mast using quick release clamps 112 and 113; the angle of the boom by adjusting the strap 162; the leverage applied to the rudder arms by the fore-aft placement of the line 166 along the rudder arms; and the position of the rudders and foot harnesses along the rudder arms by the positioning of the rudder fittings 148.

To mount the device, the rider dons the harness 12, releases boom lock 118 and attaches quick release catches 128 and 129 to the shackles 130 and 131 on the boom. Once the strap 162 has been adjusted, the rider transfers his or her weight to the harness. This causes the boom to rotate forward and tightens the rudder straps, which lifts the rudder arms. When the boom limit strap 168 becomes tight, the boom and harness support the rider's weight. Alternatively the rider can support his weight with his hands and knees while pushing off or placing his feet into the rudder foot harnesses. The rider can then start coasting or push off with his hands or feet. Once sliding, the rider then places his feet into the rudder straps.

With the rider being suspended from the harness, the strap 162 and line 166 that attach from the front of the rudder arms to the rear of the boom maintain the rudders above the surface of the snow, even with the weight of the rider's legs resting in the foot straps. The weight of the rider suspended from the front of the boom is partially balanced by the force down on the rudders transmitted through the strap 162 and line 166 which can attach at different leverage lengths on the boom and rudder arms. The leverage lengths are adjustable to achieve a balance when riding.

The bungee cord 170 of the boom limit strap 168 pulls the rear of the boom down when the rider removes his weight, thereby applying the brakes by lowering the rudder arms—a safety feature. It also automatically raises the front of the boom making it more convenient for the rider to attach himself to the device. When a rider is suspended from the front of the boom, the webbing portion 171 of this strap becomes tight, limiting the amount that the boom can drop at the front and thereby more fully supporting the rider's weight.

When a given rudder is pressed down into the snow by the rider's leg, it causes the device to turn in the opposite direction due to it being angled outward as previously described: right leg down turns the device to the left, and vice versa. The more the rudder is pressed down into the snow, the more turning action results. When both legs are pressing down, and the rider's body is supported somewhat by his hands and feet to un-weight the front of the boom to allow downward travel of the rudder arms, then both rudders penetrate the snow and act as brakes. When the rider's weight is removed from the device, the brakes automatically press down into the snow due to the action of the bungee, thereby preventing a runaway device. In addition, the device is inherently unstable when not in use on account of its high center of gravity; the device without rider will fall over onto its side after moving only a short distance. Dismounting and folding is the reverse of the above.

When transporting the device on flat terrain, such as when loading onto or unloading from a chairlift, the boom can be locked in perpendicular alignment with the mast by the boom lock 118 engaging pin 120. In this orientation, the boom may be used to control the device when scootering the device on flat terrain (i.e. with one foot in the foot strap 70 and the other pushing off the snow to propel the device forward). On the chairlift, the rider supports the weight of the device by placing the boom across the top of his legs (or on the chair structure) thus evenly distributing the weight of the device over the legs to minimize problems of restricted circulation and numbness. A tether strap between the device and the rider may be provided to prevent the device being accidentally dropped from the chairlift.

Figure 18:
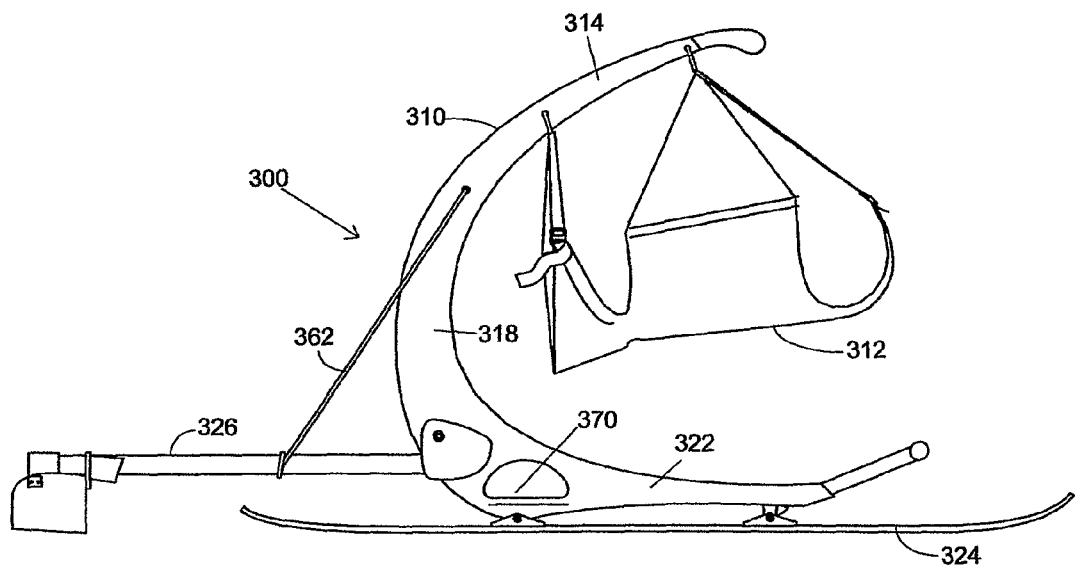
FIG. 18 A side view of another embodiment of a recreation device of the present invention that suspends a user in a generally horizontal, face down (i.e. prone) body position.
Figure 19:
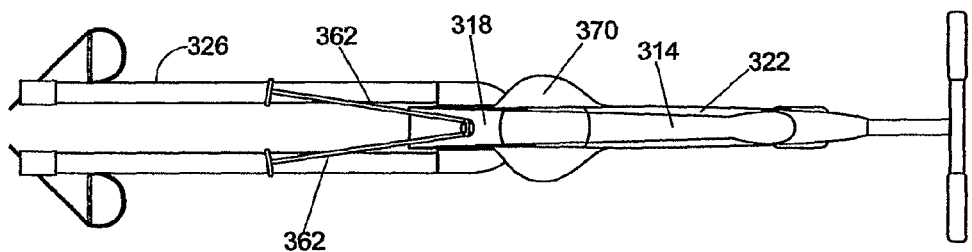
FIG. 19 A top view of the device of FIG. 18.

Referring to FIGS. 18 and 19, there is shown another embodiment of a recreation device of the present invention at 300 that does not fold and offers basic adjustments as a lower cost alternative to device 10. Device 300 comprises a composite or reinforced polymer frame 310 that incorporates the functionality of the keel, mast and boom of the previously described embodiment into a unitary support member having an analogous keel portion 322, mast portion 316 and a cantilevered boom portion 314. The keel portion 322 is similarly attached to the snowboard 324 as in the device 10. The harness 312 is attached to boom portion as in the previous embodiment. The steering/braking assembly 326 is similar to that of device 10, except that the rudder foot harnesses 350 are just straps that the rider's toes fit into. A foot pocket 370 for scootering is incorporated into the support on each side of the keel portion. The support for the rudders comprises of strong bungees 362, or alternatively, a spring enclosed in a "boot" (to prevent snow fouling).

Figure 20:
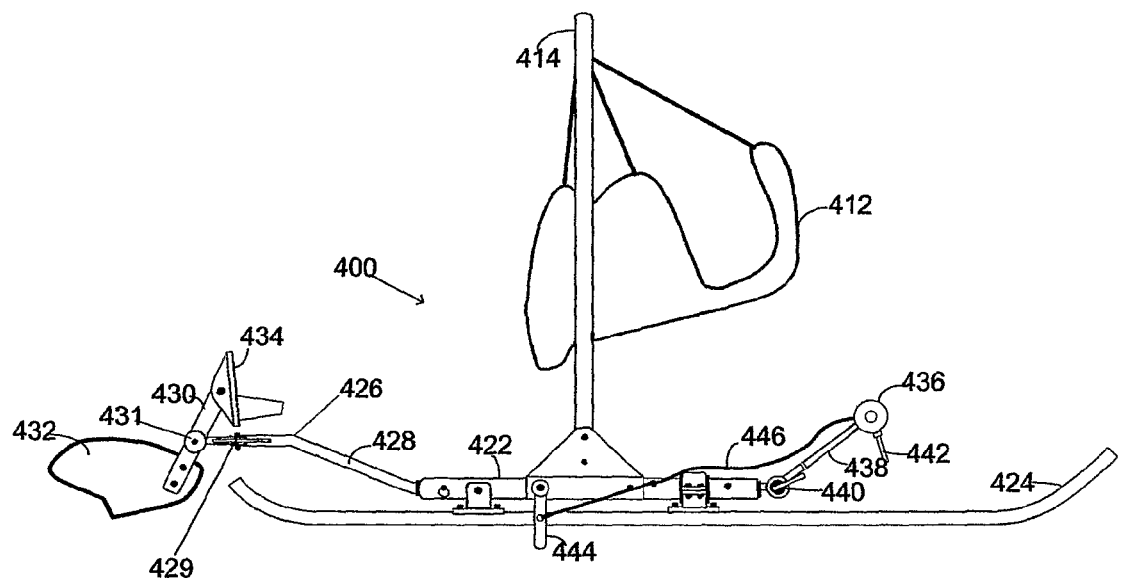
FIG. 20 A side view of another embodiment of a recreation device of the present invention that has a loop frame support.
Figure 21:
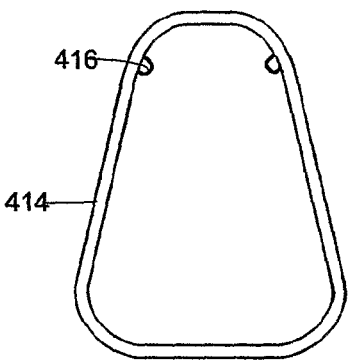
FIG. 21 A side view of a loop frame of the device of FIG. 20.

Referring to FIGS. 20 and 21, there is shown another embodiment of a recreation device of the present invention at 400. Device 400 includes a support comprising a loop frame 414 with suspension points 416 from which harness 412 is suspended within the loop. The loop frame 414 is connected to a keel 422 that is analogous to the keel 22 of device 10. The keel 422 is connected to a slide member such as a conventional snowboard 424, but could also be a ski, mono-ski and the like. A steering assembly 426 is also provided comprising a rudder assembly 430 connected to an elongate tubular rudder arm 428, which is attached to keel 422. The rudder assembly 430 is capable of side-to-side rotation via swivel connection 429, and up-down rotation via swivel connection 431. The rudder assembly includes a rudder 432 and platform 434 by which the user transmits steering inputs to the rudder. Device 400 also includes a handlebar 436 connected to a stem 438 that is adjustable by means of a pivot connection and a quick release clamp mechanism 440 connecting the stem to the keel. The handlebar includes bicycle style brake levers 442 that actuate snow brakes 444 on either side of the snowboard via cables 446.

Alternatively, the steering and braking functions on device 400 can be combined by using a steering/braking assembly that is similar to steering/braking assembly 26 of device 10. It has been found that the steering/braking assembly 26 is considerable more effective at stopping the device than the snow brakes 444, and at steering the device than the single rudder assembly 430.

Figure 22:
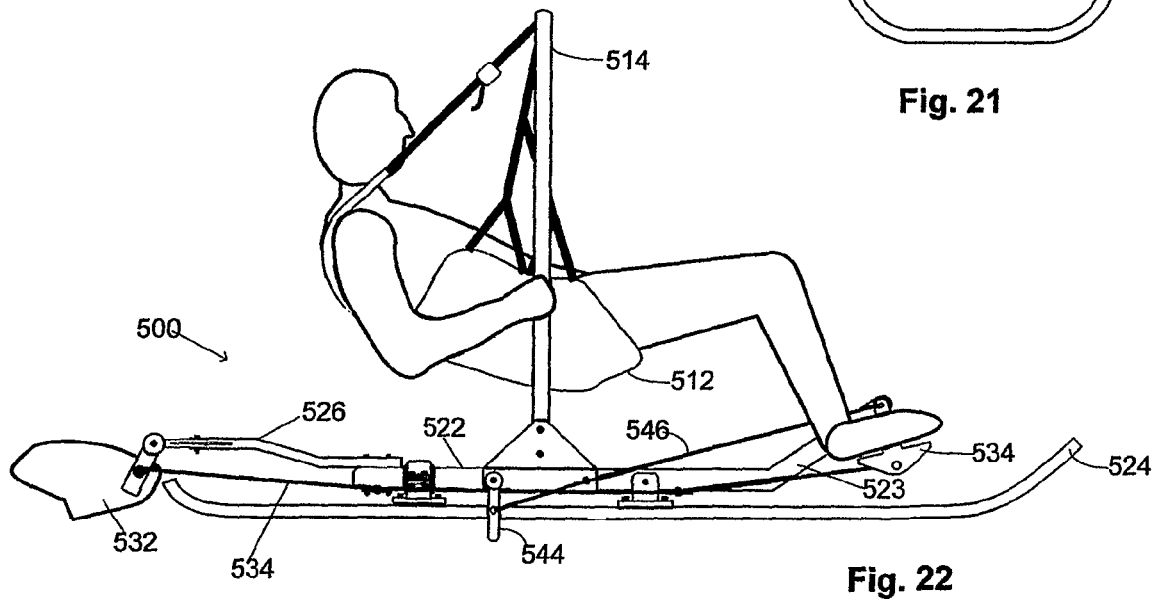
FIG. 22 A side view of another embodiment of a recreation device of the present invention that suspends a user in a generally face up (i.e. supine) body position.

Referring to FIG. 22, there is shown another embodiment of a recreation device of the present invention at 500 on which a user is suspended in a generally supine position as illustrated. Device 500 comprises a harness 512 suspended from a loop frame 514 that is similar to loop frame 414 in FIG. 21. The loop frame 514 is connected to a keel 522 that is analogous to the keel 422 of device 400, but includes a front neck 523 on which is a swivel mounted braking/steering platform 534 for supporting the user's feet and transmitting steering and braking inputs to the device. The keel 522 is connected to a slide member such as a conventional snowboard 524. A steering assembly 526 is also provided, which is similar to steering assembly 426 on device 400, except that actuation of the rudder 532 is accomplished via cables 534 that link the rudder with the braking/steering platform 534. Braking inputs from the user are transmitted from the braking/steering platform 534 via cables 546 to snow brakes 544 on either side of the snowboard.

Figure 23:
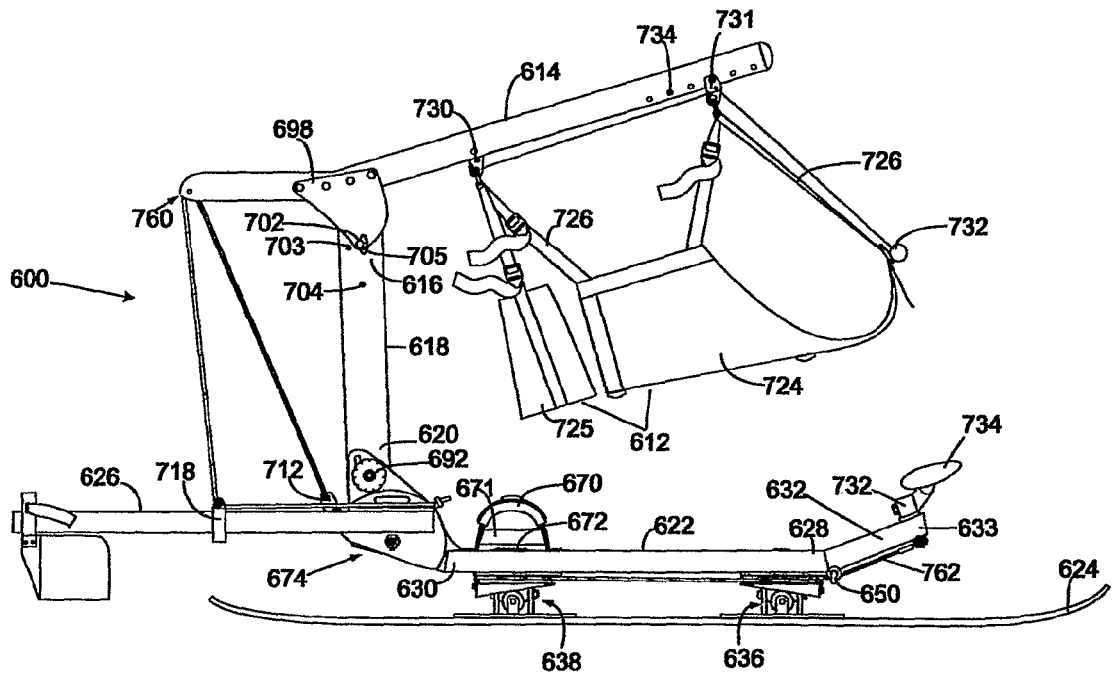
FIG. 23 A side view of a further embodiment of a recreation device of the present invention.
Figure 24:
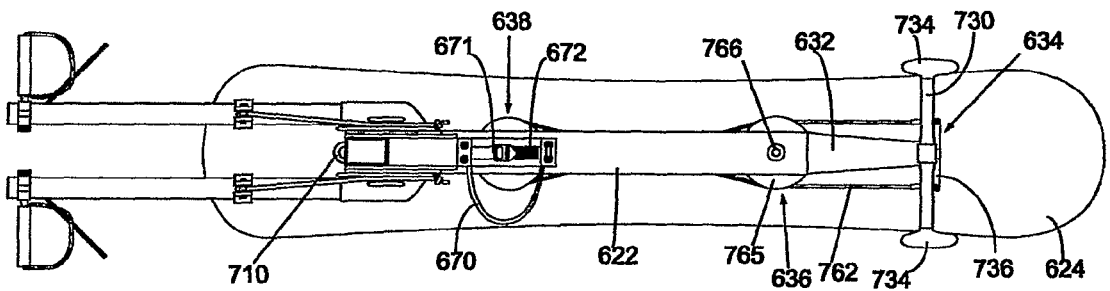
FIG. 24 A top view of the device in FIG. 23, excluding the mast and boom.
Figure 25:
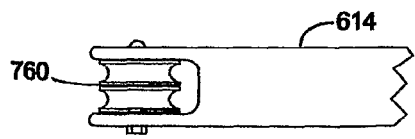
FIG. 25 A bottom view of a rear portion of the boom of the device in FIG. 23.

Referring to FIGS. 23-34, there is shown a further embodiment of the recreation device generally indicated at 600. Having regard to FIGS. 23-25, device 600 includes a harness 612 suspended from a support comprising an elongate tubular boom 614, a tubular mast 618 and a tubular keel 622. The boom 614 has a slight bend and is angled upwards to provide more clearance at the front for the rider and a better angle at the rear to attach and operate the rudder lines. As shown in FIG. 25, the rear of the boom 614 includes two pulleys 760 for the two rudder lines which are described below. The boom 614 is connected to the top portion 616 of mast 618. The bottom portion 620 of the mast is connected to the keel 622, which is connected to a slide member having a low friction bottom adapted for sliding on snow covered surfaces, such as a conventional snowboard 624, but could also be a ski, mono-ski and the like. Device 600 also includes a steering/braking assembly 626. Boom 614 is hinged to mast 618, and mast 618 and steering/braking assembly 626 are each independently hinged to keel 622, thereby enabling device 600 to be collapsed into a folded configuration.

Keel 622 comprises an elongate tubular member, generally rectangular in cross-section, and having front and rear end portions 628 and 630. A riser tube 632 is connected at the front end portion 628 and extends forward and upward away from the keel. At terminal end 633 of riser tube 632 is provided a handle bar assembly 634. The keel 622 includes front and rear tilting mount assemblies 636 and 638 for mounting the keel to the snowboard 624 and imparting a tilting force to the snowboard as will be described below. The spacing between the tilting mount assemblies 636 and 638 corresponds to the spacing between the mount points on the snowboard. A linkage such as cable 762 connects the handle bar assembly 634 to the tilting mount assemblies to cause the snowboard 624 to tilt relative to the mast assembly and keel by mechanisms that are described below. The purpose of the tilting mounts is that when operating the device in a traverse across a steep slope, especially in unfavorable snow conditions, it is not always possible to set enough of an edge to prevent sliding sideways downhill. The tilting mount allows the rider to push "away" (toward the downhill side) on the handlebars (which is necessary to keep his weight to the uphill side as the board will be somewhat balanced on the uphill edge). When the bars are pushed away, the tilting mounts press the uphill side of the snowboard downward relative to the keel and mast assembly, providing the uphill edge with more angle relative to the slope and better ability to dig into the snow surface. This feature is also useful during hard turns and when sliding sideways to stop quickly. The tilting is used in conjunction with the rudders and weight shifting to offer very good control of the device. Although the tilting mounts are shown operated by a rotating handlebar, they could also be operated by bicycle style brake levers mounted on the handlebars, or any other mechanism that will produce a "pull" on the appropriate cable or cause the cam members to rotate when needed.

An adjustable foot strap 670 having a heel strap 671, and a serrated foot pad 672 are included on the top of keel 622 adjacent the rear tilting mount assembly for use by the rider in 'scootering' the device to and from a chairlift or on generally horizontal surfaces. The heel strap 671 prevents the device from being inadvertently dropped while the rider is on the chair lift. Some riders may prefer to use a tether line which snaps onto their clothing and to the device to accomplish the same result.

To the rear end 630 of the keel 622 is bolted a mast socket assembly 674 for hingedly connecting the mast 618 and the steering/braking assembly 626 to the keel. The mast socket assembly 674 is basically the same as the mast socket assembly 74 of device 10, except that instead of a clamp 92, the mast is held from moving upwards (and hence disengaging) by a large knob 692 which clamps onto a through bolt (not shown) that passes through the side plates, spacers and mast.

Boom 614 is connected to mast 618 for hinged movement in relation thereto by a connector bracket 698 very similar to that of device 10. Hence the boom may be swung from a position in which it is cantilevered by the mast, being generally perpendicular to the mast, to a folded position in which the boom is generally parallel with the mast. The primary differences in the connector bracket from that in device 10 is that the front of the plates are curved to eliminate a pinching hazard, and the plates include a hole 702 that corresponds to holes 703 (one of which is hidden below side plate) on the mast through which the plates may be selectively connected to the mast by means of a push pin 705, that is a self locking pin with a button to operate a detent ball. Using the hole as show in FIG. 23 is for normal operation, whereas hole 703 provides a lower angle to the boom placing it in a better attitude for "scootering" in lift lines and for when the device is being carried on the chairlift during which the boom rests across the rider's lap. A lower hole 704 is provided in the mast for storing the pin 705 when the unit is folded.

Harness 612 comprises a form fitting fabric member 724 that is adapted to support the torso of a user and a lower leg support fabric member 725. The separate leg support member makes it more comfortable for some riders and easier to move around with the harness on. Both fabric members are attached by adjustable straps 726 to quick release snap shackles 730 and 731 on the boom for suspending the harness below the boom. The front snap shackle 731 is attached to the boom through one of a number of longitudinally arranged holes 734, thereby enabling a fore-aft adjustment of the snap shackle 731 to accommodate riders of different torso length or preferences. A pull cord 732 attached to the snap shackles and positioned near one shoulder of the rider allows the rider to release the snap shackles by pulling on the cord. This makes dismounting easier and allows easy disengagement from the device if the rider falls over. The harness can be a strap-on type (as shown) or it can be integral with a jacket (not shown). In some embodiments, the harness can incorporate attachments that allow it to be used as a back pack, with the device attached to it, for hiking into the back-country.

Steering/braking assembly 626 is nearly identical to the steering/braking assembly described in relation to the embodiment of the device indicated as 10. The rudder suspension lines in this embodiment are attached to a ring 710 (FIG. 24) at the back of the keel member 622 by a snap shackle 712. This shackle is released to detach and slacken the lines and lower the boom or fold the device. From the snap shackle 712, there are separate lines for each rudder that run up through the pulleys 760 at the rear of the boom (see FIG. 25), then down to their respective rudder arms and through a pulley attached to a sliding clamp 718 mounted on each rudder arm. Each line then runs forward along the rudder arm and each is secured at the base of the mast with either a standard marine cleat or a standard marine jam cleat. The sliding clamps 718 with the pulleys on the rudder arms can be adjusted fore and aft to balance the riders weight with the force of their feet on the rudders. The length of the rudder lines are adjusted at the cleats, and the lines do not have to be disturbed during folding of the device as the lines are disconnected at the rear of the keel by means of the snap shackle 712.

Referring to FIGS. 23, 25 and 26, handlebar assembly 634 comprises a horizontal handlebar 730 connected to a near vertically oriented handlebar stem 732 and terminating in raised bar ends 734 on each side for improved grip and comfort for the rider. The handlebar stem 732 is rotatably mounted through the remote end of the riser tube 632 by means of bearings, bushings or other suitable means. The end of the handlebar stem on the underside of the riser tube is fixedly connected to a horizontal actuator bar 736 that has connector means 738 at each end to which the terminal ends of the cable 762 may be attached. Horizontal actuator 736 could also be a bell crank or have a circular pulley shape in order to reduce or prevent slackness in the cables as the mechanism is rotated. The cable ends may be swaged onto threaded adjusters attached to swiveling pins at each end of the actuator bar (which are common fittings typically used with cables) by way of example of suitable connector means. Accordingly, the turning of the horizontal handlebar 730 by the rider is translated into a corresponding turning of the actuator bar 736, which acts as a lever and pulls on the attached cable end for purposes of actuating the tilting mounts. Thus, the handlebar assembly together with the cable function as an actuator means that receives input from a user and causes the tilting mount assemblies to impart a tilting force to the snowboard relative to the keel. In order for the tilting to have the correct response, it is preferable that the handlebars have some resistance to turning under normal conditions so they can be used to control the rider's side to side weight shifting. To accomplish this, a stiff hairpin spring 738 is fixedly connected around the steering column such that the hairpin spring is stationary relative to the actuator bar. A roller lever 740 is attached to the rotatable handlebar stem and moves with it when the handlebars are rotated. The roller lever is positioned such that the roller is confined between the hairpin spring and contacts the arms of the hairpin spring. When the handlebar is turned (shown in phantom lines in FIG. 26), the roller lever deforms the spring which tries to return the assembly to a central position thereby providing a centering bias to the handlebar. When titling is necessary, an extra push on the handlebar preferably causes it to overcome the centering bias of the spring. A stop block 742 may be provided to restrain the ends of the hairpin spring under substantial spring pressure. The magnitude of the centering bias can be tailored to an individuals weight and preference by changing to a stronger or weaker hairpin spring and/or inserting a standard tension coil spring with hook ends between the two eyes provided on the ends of the hairpin spring. The centering bias could also be accomplished by a ball and detent/cam mechanism, or any other suitable mechanism.

Referring to FIGS. 27 and 28, the front and rear tilting mount assemblies 636 and 638 are illustrated. The tilting mount assemblies function to connect the snowboard to the keel and also as tilt generators to impart a motive force to the snowboard to cause the snowboard to tilt or rotate relative to the keel about a longitudinal axis. Both tilting mount assemblies are very similar in structure hence the rear tilting mount assembly will be described in detail, and then the differences in structure of the front tilting mount assembly will be described. Rear titling mount assembly 638 comprises a base plate 746 that bolts to the snowboard mounting holes, and has a cast or molded bracket 748 for supporting an axle 749 therein in longitudinal alignment with the keel, and a pair of brackets 750, each displaced laterally from the bracket 748, and each including a roller 752 rotatably mounted therein and having a plane of rotation oriented longitudinally with the snowboard. About axle 749 is mounted a threaded rod end 754 that has its threaded rod portion 755 mounted through a washer 756 that rests against the eye of the rod end, a cam retainer plate 757, a rotating cam member 764, a top plate 765, the keel 622, and which is secured on the upper side of the keel by a flat or recessed nut 766. Accordingly, the aforementioned parts are clamped together between the washer 756 and the nut 766 as the nut is tightened on the threads of the rod end. In addition, the axle 749 passes through the eye of the rod end thereby connecting the base plate 746, the roller assembly, and the snowboard to the keel. Thus the rod end and axle assembly functions as a hinge connector that connects the snowboard to the keel in a manner that allows the snowboard to rotate or tilt relative to the keel about a longitudinal axis. Spacers 768 are provided on the axle 749 on either side of the rod end between the bracket and the eye of the rod end for centering the rod end relative to the axle and preventing the rod end from moving along the axle. Rotating cam member 764 comprises a ring base portion 770 having a circumferential groove 771 on its outer edge. Groove 771 is adapted for receiving the cable 762 therein as it wraps around the cam member. On diametrically opposed portions of the base portion, and facing toward the snowboard, are provided sloped cams having cam surfaces 772 and 773, each of which abuts a respective roller 752 that acts as a cam follower. The base portion 770 of the cam member is sandwiched between the washer 756 and the top plate 765 by the cam retainer plate 757 that includes a circumferential shoulder 776 that engages a complimentary shoulder 777 on the cam member. Preferably the top plate is aluminum with a low friction lower surface such as Teflon or a pre-lubricated plastic sheet, and the cam retainer plate is a low friction plastic such a high density polyethylene. Accordingly, the cam member is able to rotate relative to the keel and the snowboard while its cam surfaces ride on the rollers. The base portion and the cam retainer can be functionally thought of as a rotatable disk member upon which cams are mounted at diametrically opposed portions on the disk. As the cam member is rotated in one direction or the other, one of the cam surfaces pushes down on its corresponding roller while the other cam surface allows its corresponding roller to ride up, thereby causing the snowboard to tilt in one direction or the other in relation to the keel, depending on which direction the cam member is rotated, as illustrated in FIG. 31.

The front tilting mount assembly 636 is the same as the rear tilting mount assembly 638 with the exception that the front mount does not have spacers 768 on the axle on each side of the rod end in order to allow the rod end to slide fore and aft on its axle. This freedom of movement of the rod end on the front tilting mount allows for changes in length of the snowboard that occur between the front and rear tilting mounts as the snowboard flexes into a curve or over bumps. An additional difference is that the cam surfaces in the front tilting mount are oriented 180 degrees relative to the cam surfaces in the rear tilting mount, as shown in FIG. 23, so that preferably, the cam surfaces of both tilting mounts generally face each other and slope towards a midpoint on the keel between them thereby as the cam surfaces try to "roll off" the rollers when weight is applied, having them pointing in different directions balances these forces.

Figure 29:
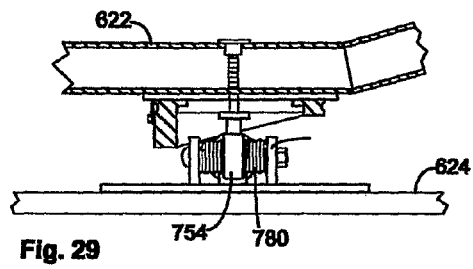
FIG. 29 A longitudinal section of a tilting mount assembly in FIG. 27 shown with a dust/snow boot.
Figure 30:
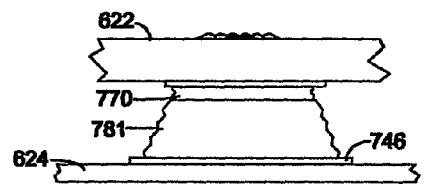
FIG. 30 A side view of another embodiment of a dust/snow boot that completely encloses a tilting mount assembly.

Referring to FIGS. 29 and 30, some embodiments of the tilting mount assemblies may include a flexible boot 780 to protect the rod end from dirt and snow, and/or they may include a larger variation of a flexible boot 781 that is bonded to the cam member and held down to the base plate by an internal molded in spring for enclosing the whole tilting mount assembly.

Figure 31:
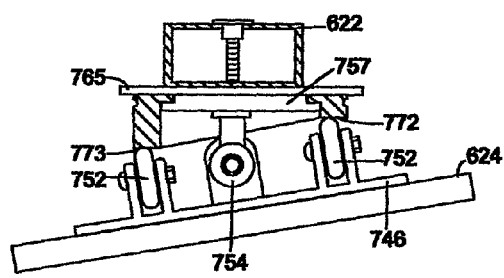
FIG. 31 A cross section view of a titling mount assembly of the device in FIG. 23 shown imparting a tilt to the snowboard.
Figure 32:
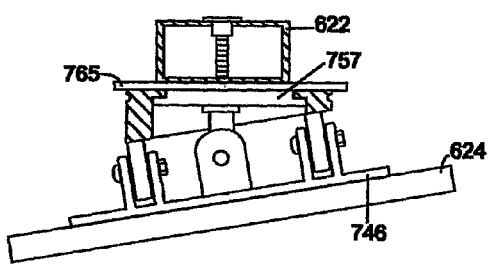
FIG. 32 A cross section view of another embodiment of a titling mount assembly shown imparting a tilt to the snowboard.

With reference to FIGS. 28, 31 and 32, FIG. 28 shows a tilting mount with the cam member in a neutral position wherein no tilting force is being transmitted to the snowboard. FIG. 31 shows a cam member with flat cam faces 772,773 which require rounded rollers as the angle of the cam face to the roller changes as they rotate relative to each other—as does the effective diameter—as the cam or the board tilt (relative to one's point of view) the effective radius of the cam relative to the rollers changes, producing some sliding motion between the two parts. FIG. 32 shows a cam member with a contoured bottom cam faces which progressively change angle around the face of the cam in order to keep the face of the cam at the same angle as the mating flat faced rollers as the cam rotates. Even though more difficult to manufacture, this configuration may be preferable as the cam can contact flat rollers which have a more load bearing surface. If the cam is plastic, then the contoured surface may be readily made once a mould is produced. The contoured cam face/flat rollers still have some sliding motion as the cam rotates due to the effective change in diameter as the tilt occurs.

Figure 33:
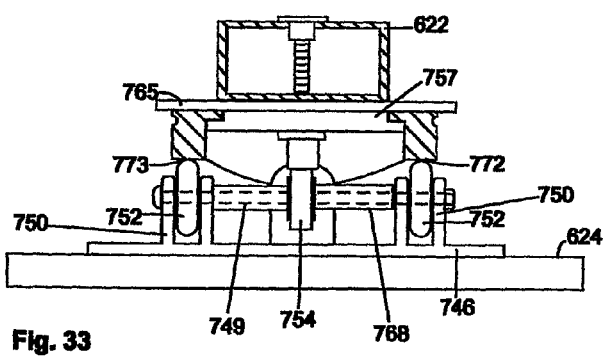
FIG. 33 A cross section view of a further embodiment of a titling mount assembly shown in a neutral position.

Referring to FIG. 33, an alternative embodiment of a rear tilting mount is shown that may be preferable in some instances, wherein the axle 749 (show in phantom lines) is oriented across the snowboard and the rod end 754, which is responsible for absorbing fore and aft forces between the keel and the snowboard, is oriented longitudinally whereby its resistance to these forces is greater. In this embodiment, the brackets 750 are use by both the rollers and the axle such that the rollers and the eye of the rod end are mounted coaxially on the axle. Spacers 768 are mounted on the axle on either side of the rod end to keep it centered.

Figure 34:
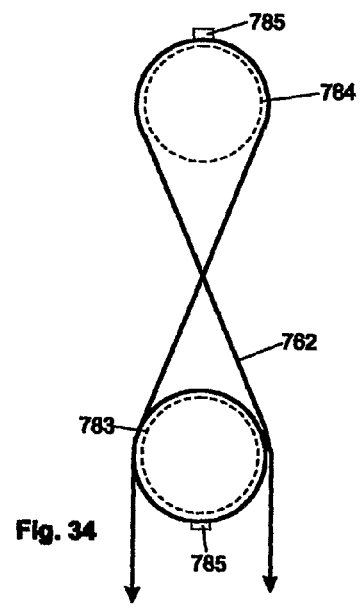
FIG. 34 A top view showing the path of the cable around the rotating cam members of the device in FIG. 23.

FIGS. 23, 24 and 34 illustrate the path of the cable 762 in device 600. Referring to FIG. 34, the path of the cable around the cam members is shown when viewed from the top and from point of view of a rider. For convenience of reference, the cable will be said to originate from its point of attachment on the right side of the horizontal actuator bar 736 and terminate at its point of attachment on the left side of the horizontal actuator bar. Thus, from its origin, the cable runs generally parallel to the riser tube 632 and passes through guide pulley 650 (see FIG. 23) that aligns the cable with the grooves 771 on the rotating cam members. Preferably, the guide pulley includes a restrainer strap to prevent the cable from coming off the pulley. From the guide pulley, the cable wraps clockwise around the front cam member 783 and then runs backward, crosses over to the left side of the keel, and wraps around the back of the rear cam member 784 in a counter-clockwise direction. The returning cable crosses over again to the left side of the keel, runs to the side of the front cam. It then passes through another guide pulley on the left side, and then to its point of termination. A clamp assembly 785 (see FIG. 27) on each cam member is used to tighten the cable into the groove 771 to prevent slippage of the cable within the groove. The purpose of the crossover is so that the cam member in the tilting mounts rotate in opposite direction in response to an input in the handlebar. This is necessary to accomplish a uniform tilting movement in the described embodiment because the cam surfaces in the front mount are oriented 180 degrees relative to the cam surfaces in the rear mount. Without the crossover in this described embodiment, an input from the handlebar would result in a twisting of the snowboard as the front mount would tilt in one direction whereas the rear mount would tilt in the opposite direction.

While the above embodiments of the present invention have been described and illustrated as having particular features, it should be understood that some features described in relation to one embodiment may be used in an another embodiment. Thus, by way of an example, a further embodiment (FIG. 35) of the invention may be derived that includes the mounting assemblies of device 10 in combination with either one or more of the boom, connector bracket, rudder lines and handlebar of device 600 and in this case a rigid rather than flexible front mount assembly.

While the above description and illustrations constitute preferred or alternate embodiments of the present invention, it will be appreciated that numerous variations may be made without departing from the scope of the invention, which is defined in the appended claims.

The embodiments of the invention in which an exclusive property or privilege is claimed are defined as follows:

1. A recreation apparatus for sliding downhill on a surface, the apparatus comprising:
    a slide member having a top and a low friction bottom adapted for sliding on the surface;
    a support connected to the top of the slide member and extending upward away therefrom, wherein the support comprises a keel connected to the to of the slide member, a mast connected to the keel and extending upwards from the slide member, and a cantilevered boom connected to the mast and extending over the slide member; and
    a harness suspended from the cantilevered boom for suspending a user of the apparatus above the surface.

2. The apparatus as claimed in claim 1, wherein the support and the harness suspend the user in a generally horizontal position.

3. The apparatus as claimed in claim 2, wherein the support and the harness suspend the body of the user in a generally face down position.

4. The apparatus as claimed in claim 3, further comprising a handhold connected to the support or the slide member for being grasped by the user.

5. The apparatus as claimed in claim 4, wherein the mast is connected for hinged movement in relation to the keel such that the mast may be swung from an upright position to a folded position in which it is generally parallel with the keel.

6. The apparatus as claimed in claim 5, wherein the boom is connected for hinged movement in relation to the mast such that the boom may be swung from an operable position in which the boom is generally perpendicular to the mast, to a folded position in which the boom is generally parallel with the mast.

7. The apparatus as claimed in claim 6, further comprising a steering mechanism connected to the support or the slide member for being actuated by the user to steer the apparatus while it is in motion.

8. The apparatus as claimed in claim 7, wherein the steering mechanism comprises two parallel arms, each hingedly connected to the support on either side of the median plane of the apparatus, and each having a remote end that extends rearwards beyond the periphery of the slide member, each arm being independently moveable by the user between a first position in which the remote end scrapes the surface and a second position in which the remote end is removed from the surface.

9. An apparatus for attaching to a snowboard to provide a recreation device for sliding downhill on a surface, the apparatus comprising:
    a support that may be connected to the snowboard such that it extends upward away therefrom, wherein the support comprises a keel adapted to connecting to a to surface of the snowboard, a mast connected to the keel and extending upwards from the snowboard, and a cantilevered boom connected to the mast and extending over the snowboard; and
    a harness suspended from the cantilevered boom, wherein the support and harness suspend a user of the device above the surface.

10. The apparatus as claimed in claim 9, wherein the support and the harness suspend the user in a generally horizontal position.

11. The apparatus as claimed in claim 10, wherein the support and the harness suspend the body of the user in a generally face down position.

12. The apparatus as claimed in claim 11, further comprising a handhold connected to the support for being grasped by the user.

13. The apparatus as claimed in claim 12, wherein the mast is connected for hinged movement in relation to the keel such that the mast may be swung from an upright position to a folded position in which it is generally parallel with the keel.

14. The apparatus as claimed in claim 13, wherein the boom is connected for hinged movement in relation to the mast such that the boom may be swung from an operable position in which the boom is generally perpendicular to the mast, to a folded position in which the boom is generally parallel with the mast.

15. The apparatus as claimed in claim 14, further comprising a steering mechanism connected to the support for being actuated by the user to steer the apparatus while it is in motion.

16. The apparatus as claimed in claim 15, wherein the steering mechanism comprises two parallel arms, each hingedly connected to the support on either side of the median plane of the apparatus, and each having a remote end that extends rearward beyond the periphery of the snowboard, each arm being independently moveable by the user between a first position in which the remote end scrapes the surface and a second position in which the remote end is removed from the surface.

17. The apparatus as claimed in claim 4 further comprising at least one tilt generator that connects the support to a slide member, the tilt generator having an actuator means that receives input from a user and causes the tilt generator to impart a motive force to the slide member to tilt the slide member about a longitudinal axis relative to the support.

18. The apparatus as claimed in claim 17 wherein the tilt generator comprises:
   a hinge connector for connecting the slide member to the support such that the slide member is able to tilt about a longitudinal axis relative to the support;
   a cam movably mounted on each side of the support and being connected to the actuator means in a manner that the actuator means simultaneously causes the cam on one side to move in one direction and the cam on the opposite side to move in an opposite direction;
   a corresponding number of cam followers mounted on the slide member such that the cam followers cooperate with the cams to impart the motive force to the slide member to tilt the slide member relative to the support.

19. The apparatus as claimed in claim 18 wherein the tilt generator further comprises a disk member rotatably mounted on the support wherein the cams are mounted on the disk member at diametrically opposed portions, one cam generally located on each side of the support, and the movement of the cams results from the rotation of the disk member.

20. The apparatus as claimed in claim 19 wherein the disk member further includes a circumferential groove on its edge, and the actuator means comprises:
   a cable wound around the disk member within the groove; and
   at least one lever that is moveable by the user and to which the cable ends are connected whereby movement of the lever translates to rotation of the disk member and hence movement of the cams.

* * * * *

UNITED STATES PATENT AND TRADEMARK OFFICE
CERTIFICATE OF CORRECTION

PATENT NO. : 8,096,563 B2  Page 1 of 1
APPLICATION NO. : 11/815388
DATED : January 17, 2012
INVENTOR(S) : Buchwald et al.

It is certified that error appears in the above-identified patent and that said Letters Patent is hereby corrected as shown below:

IN THE CLAIMS:

Column 15, claim 1, line 66: "to the to of the slide" should be changed to -- to the top of the slide --

Column 16, claim 9, line 44: "to a to surface of the" should be changed to -- to a top surface of the --

Signed and Sealed this
Tenth Day of April, 2012

David J. Kappos
*Director of the United States Patent and Trademark Office*